3 Sheets—Sheet 1.

G. H. POOR.

MECHANISM FOR RAISING AND LOWERING BERTHS.

No. 11,489. Reissued Apr. 16, 1895.

Witnesses.
J. H. Robinson.
Henry C. Rexford

Inventor.
Geo. H. Poor.
by Howe & Kellogg
attys.

3 Sheets—Sheet 2.

G. H. POOR.

MECHANISM FOR RAISING AND LOWERING BERTHS.

No. 11,489. Reissued Apr. 16, 1895.

Witnesses.
Jas. H. Robinson.
Henry L. Radford

Inventor.
Geo. H. Poor.
by
Howe & Kellogg
attys.

G. H. POOR.
MECHANISM FOR RAISING AND LOWERING BERTHS.
No. 11,489. Reissued Apr. 16, 1895.
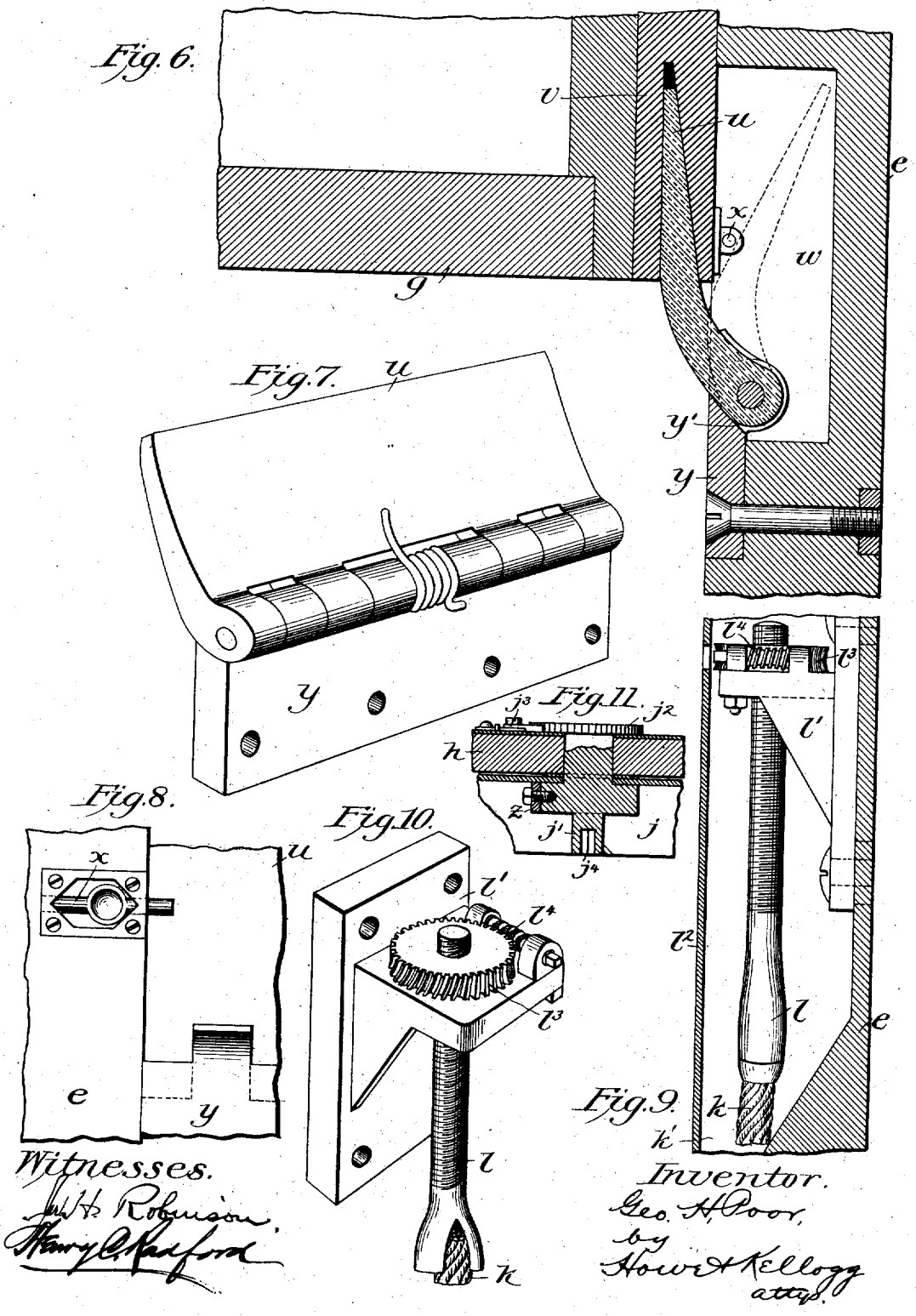
Witnesses.
Jno. H. Robinson.
Henry C. Redford
Inventor.
Geo. H. Poor,
by Howe & Kellogg
attys.

UNITED STATES PATENT OFFICE.

GEORGE H. POOR, OF BOSTON, MASSACHUSETTS, ASSIGNOR TO THE AMERICAN PALACE CAR COMPANY, OF MAINE.

MECHANISM FOR RAISING AND LOWERING BERTHS.

SPECIFICATION forming part of Reissued Letters Patent No. 11,489, dated April 16, 1895.

Original No. 520,760, dated May 29, 1894. Application for reissue filed January 7, 1895. Serial No. 534,134.

*To all whom it may concern:*

Be it known that I, GEORGE H. POOR, of Boston, in the county of Suffolk and State of Massachusetts, have invented certain new and useful Improvements in Mechanism for Raising and Lowering Berths, of which the following is a specification.

My invention has relation to that kind of sleeping cars, vessels for navigation, &c., in which sleeping berths are raised from pockets beneath the floor or from low storage position, to a higher point to be in position for occupancy.

It is the object of my invention to provide such improvements in means for raising and lowering berths as will enable the same to be done with greater ease and rapidity than is the case with contrivances now employed.

It is also the object of my invention to simplify the construction of the means for raising and lowering berths, and render the same certain and safe in operation. All appliances being outside of the berth, there is no liability of the mechanism soiling or in any way interfering with the contents of the berth.

To these ends my invention consists of the improvements which I will now proceed to describe and claim.

Reference is to be had to the annexed drawings and to the letters marked thereon, forming a part of this specification, the same letters designating the same parts or features as the case may be, wherever they occur.

Figure 1:
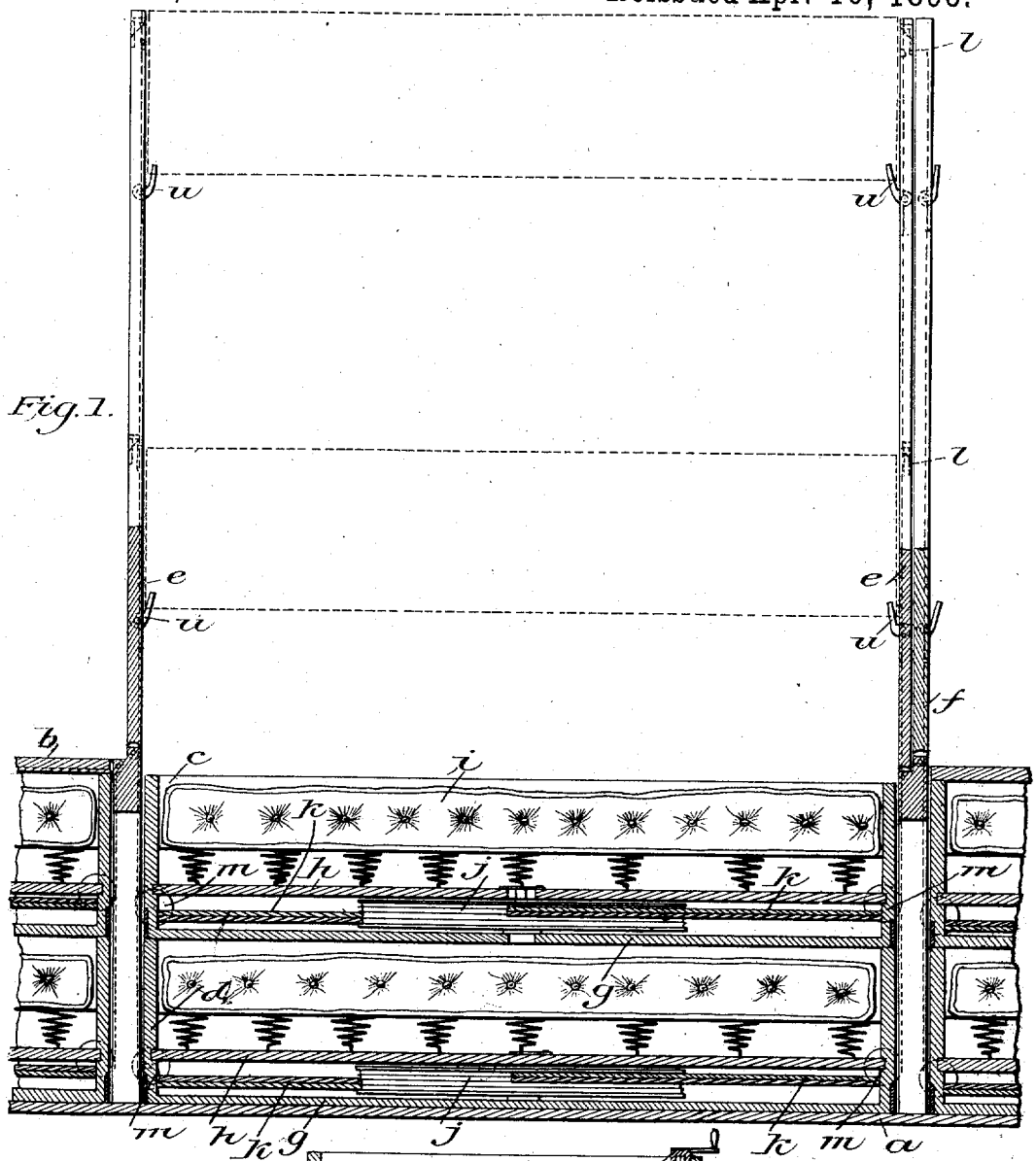
Figure 2:
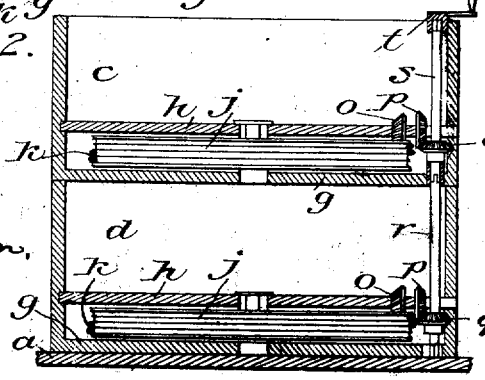
Figure 3:
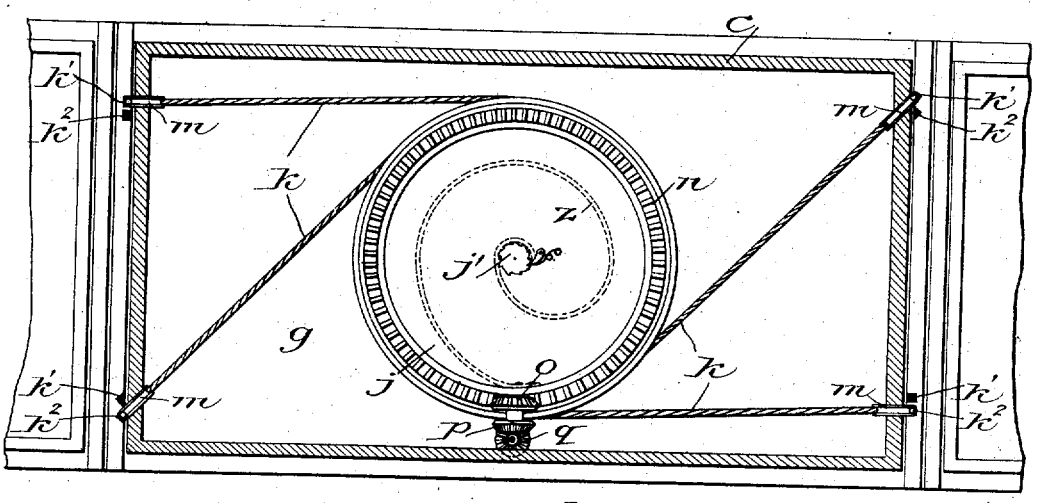
Figure 4:
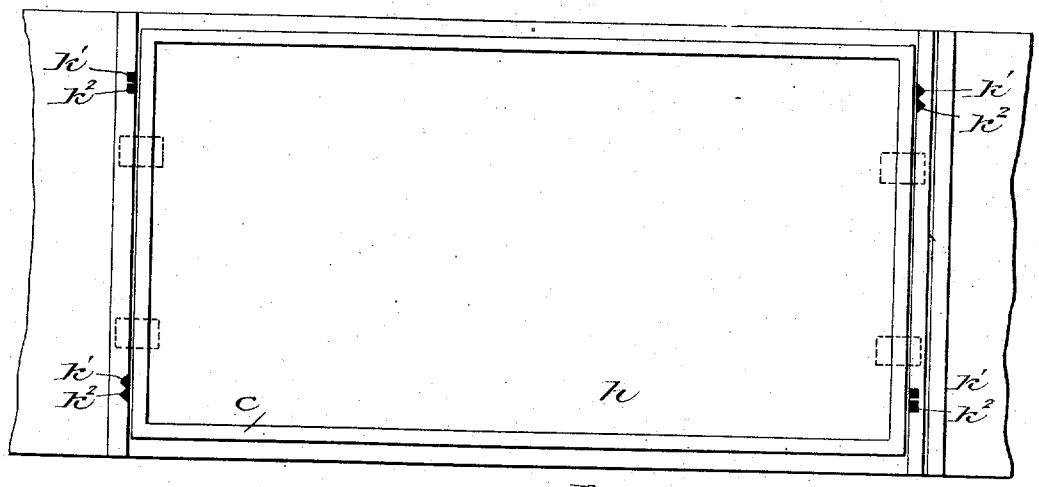
Figure 5:
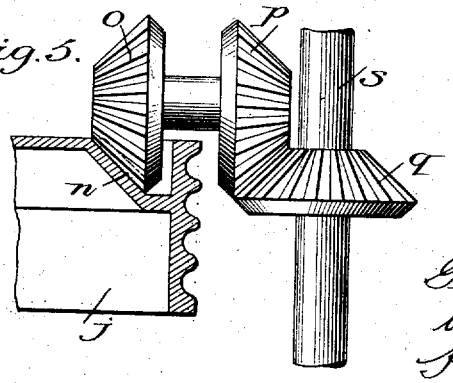

Of the drawings—Figure 1 is a sectional side elevation of a berth-section, its storage pocket or compartment, and end supports, equipped with my improvements, parts of the adjacent sections being also shown. Fig. 2 is a cross section taken in the plane of the axis of the winding wheels. Fig. 3 is a sectional plan view taken in a plane above one of the winding wheels. Fig. 4 is a plan view showing the berth in raised position and locked. Fig. 5 is a detail view showing the immediate means for operating the winding wheels. Fig. 6 is a sectional view drawn to an enlarged scale, showing the manner of securing a berth in raised position, and locking it to the partition of the section. Fig. 7 is a perspective view of the berth holder and lock. Fig. 8 is a detail view of means for holding the berth holder and lock back out of operative position. Fig. 9 is a sectional detail view showing means for securing one end of the cables to the section partitions. Fig. 10 is a perspective view of part of the means shown in Fig. 9. Figs. 5 to 10 inclusive, are drawn to an enlarged scale. Fig. 11 is a detail view hereinafter referred to.

In the drawings *a* designates what, for the purpose of this specification, may be supposed to be the bottom of the car body, and the floor is elevated above said bottom to provide pockets or compartments for the storage of the berths *c d* when the same are out of use. The double floor sections *e f* over the pockets are hinged at their ends to stationary parts of the car so that they may be raised from horizontal to vertical position, as shown in Fig. 1, and so form the partitions between the sections.

Each berth is composed of end and side parts and a bottom *g* and a false bottom *h*. The space above the false bottom *h* is adapted to receive the mattress *i* which may be spring-supported. Between the bottom and the false bottom of each berth I arrange in horizontal position a winding wheel *j* of a diameter as great as can be conveniently accommodated, or as great as may be necessary, which wheel is grooved upon its periphery to receive coils of the lifting cables *k* which may be wound thereon.

There are four lifting cables for each berth—two at each end—one of the ends of each cable being connected to the winding wheel *j*, and the other to a threaded metal shank *l* (see Figs. 9 and 10) which extends through an arm of a bracket $l'$ fastened to one of the floor sections at the outer or free end thereof and contained in a recess in said floor section, said recess being covered by a plate $l^2$. A worm wheel $l^3$, is screwed on said shank and bears on the upper side of the bracket-arm, and a worm $l^4$ mounted in bearings on said arm engages said worm wheel, and has a projecting square end to which a suitable implement may be applied for turning the worm thereby taking up slack in the cable, an opening being provided in the cover-plate $l^2$ to accommodate such implement. It will be observed by this construction I avoid projections from the floor sections. The cables will be so arranged as to pass from the wheel $j$ out of the berths over pulleys $m$ disposed at or near their lower corners, and thence up. It may be in grooves $k'$ (see Fig. 9) formed in the ends of the berths and partitions to their fastening point. The wheels $j$ have bevel teeth $n$ formed in their upper face at or near their edges adapted to be engaged by the teeth of a small miter gear $o$ fixed upon the inner end of a short shaft properly supported, on the outer end of which shaft is fixed a similar gear $p$, (see Fig. 5) which is adapted to engage a like horizontally arranged miter gear $q$.

A shaft $r$ extends through the miter gear $q$ of the lower berth and up to a point just below the miter gear $q$ of the upper berth, and the last mentioned gear receives a shaft $s$ which is adapted at its lower end to engage and be locked with the upper end of the shaft $r$, so that, supposing the berths to be down (as shown in full lines in Fig. 1) the shaft $s$ may be inserted through a suitable bearing, then through the miter gear $q$, of the upper berth and be locked with the upper end of the shaft $r$, when by the application to the upper end of the shaft $s$ of a crank $t$, the gears $o\ p\ q$ and the wheels $j$ may be rotated to wind up and unwind the cables and raise the berths out of, or lower them in their pockets or compartments.

When the berths are above their pockets or compartments, the shaft of the crank may be inserted through a hole in the side of either berth and engaged with a gear $p$ so that by the turning of the said crank each berth may be raised and lowered independent of the other.

When the berths are raised to the desired height (see dotted lines in Fig. 1) they may be engaged at their ends by wedge-shaped catches or dogs $u$, which enter the bottom of similarly-shaped recesses formed in metallic blocks or pieces $v$ suitably secured to the ends of the berth, and so not only hold the berths in raised position, but lock them to their partitions, and in this way form a structure in which each section of a made-up series shall form an end support for the other sections. In other words, so that the several sections of a series shall be as it were, solidly connected. (See Figs. 6, 7 and 8.)

When the berths are to be lowered into their pockets, they will first be raised sufficiently far to release the catches or dogs $u$ which may be folded back into recesses $w$ formed in the sides of the partitions, as shown by dotted lines in Fig. 6, in which position they may be held by a laterally sliding bolt $x$ (see Fig. 8) connected to the partitions and moved in front of the said dogs, or by other suitable means when the berths may be lowered without further obstruction. The dogs $u$ may be pivoted on a metal support $y$ which may serve the double purpose of attaching the dogs to the partitions, and also form a bearing at the point $y'$ for the dogs when the latter are operating to hold the berths in raised position. (See Figs. 6 and 7.)

I may provide each wheel $j$ in one of its under side hollow faces with a counterbalancing spring $z$ (shown by dotted lines in Fig. 3) secured at one end to the wheel and at the other end to the axis or shaft $j'$ upon which the wheel turns, in such manner that when the wheel is turned to lower the berth the spring will be wound up, and when the said wheel is operated to raise the berth the spring will be unwound. By this means should the normal supports for the berth by any chance give way, the counterbalancing spring may still support it against running down.

The pulleys $m$ arranged at or near the corners of the berths, under or around which the cables $k$ pass extend into the grooves $k'$ $k^2$ formed in the partitions and ends of the pockets, by which means the berths are guided in their movements and maintained against any undue play or motion sidewise. This is an important feature of the invention.

When my improvements are constructed and arranged as shown in the drawings, the upper berth may be fully raised and lowered by turning its wheel to an extent of less than one revolution, and the lower berth may be similarly operated by turning its wheel a little over one-half of a revolution, and the work of raising and lowering the berths may be speedily and easily accomplished.

In view of the fact that it may be necessary from time to time to adjust the tension or stress of the counterbalancing spring $z$, I may provide means for this adjustment such as is shown in Fig. 11 wherein a ratchet wheel $j^2$ is secured to the upper end of the shaft or journal stud $j'$ of the wheel $j$, and a holding pawl $j^3$ is pivoted upon the false bottom $h$, which pawl engages the ratchet wheel to prevent the same and the wheel $j$ from running back by the stress of the spring $z$. The lower end of the stud $j'$ is provided with a squared hole $j^4$ for the reception of a key or crank so that the stud $j'$ may be turned to adjust the tension of the spring $z$, and when the adjustment is made the spring may be maintained under the adjusted tension by the pawl $j^3$ engaging ratchet wheel $j^2$ fast on the said journal stud.

It is to be noted that the wheel $j$ occupies but little room, and that all of the parts are out of the way of interfering with the makeup of the berths.

Having thus explained the nature of the invention and described a way of constructing and using the same, though without attempting to set forth all the forms in which it may be made or all of the modes of its use, it is declared that what is claimed is—

1. A berth raising and lowering means comprising in its construction a berth having a bottom and a false bottom a wheel horizontally arranged between the bottom and false bottom, cables connected at one end to the said wheel and at the other end to the berth support, and means for actuating the said wheel, as set forth.

2. A berth raising and lowering means comprising in its construction a horizontally arranged wheel provided with gear teeth, below the bed or mattress, cables connected at one end to the said wheel and at the other end to the berth support, and gearing engaging the gear-teeth of the wheel for actuating the latter, as set forth.

3. A berth raising and lowering means comprising in its construction a horizontally arranged wheel below the bed or mattress, cables connected at one end to the said wheel and at the other end to the berth support, a spring, one end of which is connected to the said wheel and the other end connected to the shaft upon which said wheel turns, said spring operating with a tendency to wind the cables on said wheel, and means for actuating said wheel, as set forth.

4. A berth raising and lowering means comprising in its construction a horizontally arranged wheel below the bed or mattress, cables connected at one end to the said wheel and at the other end to the berth support, a spring, one end of which is connected to the said wheel and the other end connected to the shaft upon which said wheel turns, said spring operating with a tendency to wind the cables on said wheel, means substantially as described for adjusting the tension of the said spring, and means for actuating the said wheel, as set forth.

5. A berth adapted to be raised and lowered and provided with a bottom and a false bottom; a space between said bottom and false bottom; means for raising and lowering the berth arranged within said space, and cables connected at one end to said means and at the other end to the berth support, as set forth.

6. A berth adapted to be raised and lowered, cables connected to the partitions and adapted to raise and lower the berth, means for operating said cables and to which said cables are also attached, said means being connected to said berth, pulleys at the ends of the berth under or around which said cables pass, a part of each of said pulleys extending beyond the plane of the berth, and grooves in the berth partitions into which said extended parts of said pulleys project, as set forth.

In testimony whereof I have signed my name to this specification, in the presence of two subscribing witnesses, this 10th day of December, A. D. 1894.

GEO. H. POOR.

Witnesses:
CHAS. A. KELLOGG,
HENRY C. RADFORD.